Dec. 9, 1969   J. A. WAGLE   3,483,037
ISOTOPE POWERED PHOTOVOLTAIC DEVICE
Filed Dec. 16, 1965
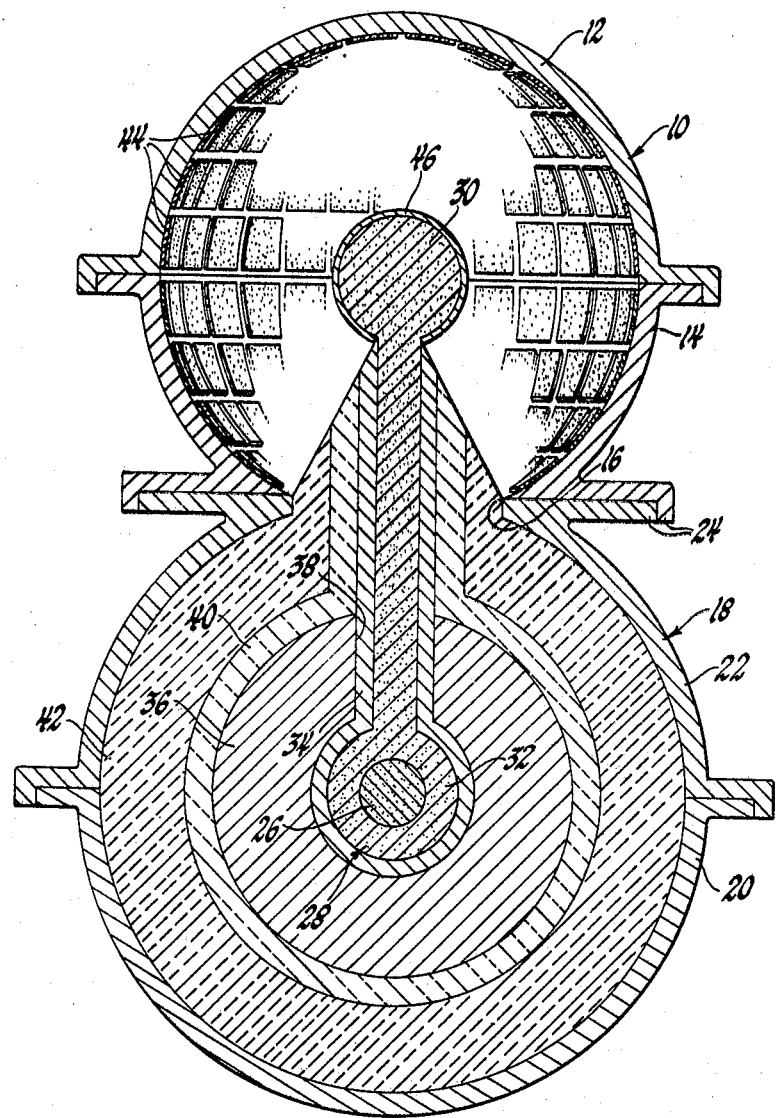
INVENTOR.
Joseph A. Wagle
BY
Warren D. Hill
ATTORNEY

United States Patent Office 3,483,037
Patented Dec. 9, 1969

3,483,037
ISOTOPE POWERED PHOTOVOLTAIC DEVICE
Joseph A. Wagle, New Augusta, Ind., assignor to General Motors Corporation, Detroit, Mich., a corporation of Delaware
Filed Dec. 16, 1965, Ser. No. 514,233
Int. Cl. H01v 3/00; H01l 15/02; H02p 11/00
U.S. Cl. 136—89                      4 Claims

ABSTRACT OF THE DISCLOSURE

A radiant energy conversion device includes a pair of interconnected evacuated spheres. One carries an array of photovoltaic cells concentric with a radiant body. Heat is supplied to the radiant body from a mass of radioactive isotopes in the other sphere through a mass of graphite. Thermal insulation and biological shielding are provided around the isotope mass.

---

This invention relates to a device for converting heat to electricity and more particularly to means for converting radiant energy from a hot body to electricity.

It has been proposed to generate electricity from the heat created within a mass of radioactive isotope material by surrounding the mass with photovoltaic cells which receive the electromagnetic radiation emitted from the mass and which convert the radiation energy to useful electrical energy. However, with this arrangement certain radiations such as gamma rays from the radioactive isotope will in time impair the proper functioning of the photovoltaic cells. In addition, if such a device were to be used in close proximity to living organisms, biological shielding is required. The shielding material must then surround the outer portions of the energy conversion unit. A very large mass of material would thus be required, making the total device very cumbersome and heavy.

It is, therefore, an aim of the present invention to provide a radioisotope powered radiant energy conversion device wherein the photovoltaic cells are not exposed to a significant amount of gamma radiation and where the mass of biological shielding is minimized.

This invention is carried out by providing a radioactive isotope energy source at a position remote from an array of photovoltaic cells and transferring the heat from the energy source to a radiation body proximate the cells.

The above and other advantages will be made more apparent from the following description taken in conjunction with the drawing which is a cross sectional view of a radiant energy conversion device according to the invention.

The drawing shows a housing, preferably of aluminum, having the general shape of two juxtaposed spheres. The upper sphere comprises a radiant chamber 10 composed of an upper flanged hemisphere 12 which mates with a lower flanged hemisphere 14. The latter has an opening 16 at its bottom which is coextensive with an opening in the lower sphere which is an isotope chamber 18. The isotope chamber 18 is composed of a lower hemisphere 20 which is flanged to mate with an upper hemisphere 22 containing the aforesaid opening 16. The two spheres are joined by two flanges 24. A mass of radioactive isotope material 26 is located at the center of the isotope chamber 18. This material preferably is a reasonably inexpensive fission product such as cerium 144 or strontium 90. Other isotopes, however, may be used. The mass of radioactive isotope 26 comprises the isotope energy source and is surrounded by a mass of thermally conducting material 28 such as graphite. The mass of conducting material 28 extends through the opening 16 into the radiant chamber 10 and terminates in a spherical end to form a radiant energy source or radiation body 30 in the center of the radiant chamber. Thus, the graphite heat conductor assumes the shape of a dumbbell with one end 32 which is hollow to receive the mass of isotope 26. In order to conserve the heat generated by the isotope 26 and to insure that it be transmitted to the radiant chamber 10 the graphite conductor 28, except the radiant energy source 30, is encased with an insulator 34 suitable for high temperatures, such as thoria. A mass of biological shielding material 36 such as steel or uranium concentrically surrounds the isotope source 26 adjacent the insulator, except for a passage 38 required for the conductor 28 and its thoria insulating coating 34. To further insulate the isotope energy source 26, another layer of insulating material 40 surrounds the biological shielding mass 36 and extends along the shank of the thoria-coated dumbbell. This insulating material 40 is one which is effective at an intermediate tempertaure range and may consist of a ceramic material such as Cercor. The remainder of the isotope chamber 18 between the intermediate temperature range insulation 40 and the housing is filled with still another type of insulating material 42 commonly referred to as super-insulation. This material is composed of alternate layers of metallic foil and ceramic cloth, the whole being maintained in a vacuum. The radiant chamber 10 includes an array of photovolatic cells 44 mounted on the internal surface of the housing. The photovoltaic cells 44 are silicon or preferably germanium semiconductors having appropriate electrical interconnections and output leads, not shown, to provide a useful electrical output. The surface of the graphite radiant energy source or radiant body 30 is clad with material 46 suitable to enhance the efficiency of its radiation properties. Tungsten cladding which may be applied by plasma spraying is a preferred material. A vacuum is maintained in both chambers 10 and 18.

With the arrangement described above, the temperature of the isotope mass 26 will be in the range of 2,000 to 3,000 degrees F., depending upon the specific materials and their dimensional design. Due to the heat transfer characteristics of the conducting material 28 and the various types of insulating material, the temperature of the radiant energy source 30 will be 200 or 300 degrees F. lower than the temperature of the isotope mass 26. It will be apparent from the above that in operation the heat generated within the radioactive isotope will be transferred through the conductor 28 to the radiant body 30. Electromagnetic radiations determined by the temperature of the radiant body 30 and the surface material 46 of that body will radiate through the radiant chamber to impinge upon the several photovoltaic cells 44 which will convert this energy to useful electrical energy.

It will be seen that since the isotope source 26 is effectively isolated from the photovoltaic cells 44 no significant amount of the harmful gamma radiation will reach the cells. Even though the shielding material 36 does not enclose the radioisotope source at the passage 38 where the thermal conductor extends to the radiant chamber 10, the considerable mass of the thermal conductor 28 itself will act as a radiation shield in that direction. It will also be seen that the biological shielding material 36 surrounds only the relatively small volume containing the isotope 26, the portion 32 of the thermal conductor intimately associated therewith, and the high temperature insulator 34. This results in a shielding mass many times smaller than that which would be required around a relatively large radiant chamber containing a radioisotope. Another advantage of the structure according to this invention is that assembly and maintenance operations on the radiant chamber 10 are greatly simplified by having the radioisotope 26 isolated therefrom.

It is not contemplated that the invention be limited to the preferred embodiment discussed herein, but rather the scope of the invention is defined by the following claims.

I claim:
1. A radiant energy conversion device comprising a pair of interconnected evacuated chambers, one chamber containing radiation means for emitting electromagnetic radiation when heated to a high temperature and an array of photovoltaic cells around the radiation means for converting the radiation therefrom to electricity, the other chamber containing a heat source and thermal insulation around the heat source, and means for transferring heat from the heat source to the radiation means comprising thermally conductive means surrounding the heat source and extending to the radiation means.

2. A radiant energy conversion device comprising two interconnected spherical evacuated chambers including a radiation chamber and an isotope chamber, a generally spherical array of photovoltaic cells mounted within the radiation chamber, a radiation body centrally mounted within the radiation chamber, means for heating the radiation body to a high temperature including a radioactive isotope heat source disposed within the isotope chamber and a mass of thermally conducting material extending between and in thermal contact with the heat source and the radiation body.

3. A radiant energy conversion device as defined in claim 1 wherein the mass of thermally conducting material surrounds the heat source.

4. A radiant energy conversion device as defined in claim 1 wherein the isotope chamber contains insulation means and biological shielding means substantially surrounding the heat source.

References Cited

UNITED STATES PATENTS

| | | | |
|---|---|---|---|
| 2,588,254 | 5/1952 | Lark-Horovitz et al. | 136—89 |
| 2,868,990 | 1/1959 | Reardon et al. | 250—106 |
| 2,913,510 | 11/1959 | Birden et al. | 136—202 |
| 2,942,110 | 6/1960 | Lehvoc | 136—89 X |
| 3,031,519 | 4/1962 | Silverman | 136—89 |
| 3,075,030 | 1/1963 | Elm et al. | 136—208 |
| 3,077,505 | 2/1963 | Eshaya | 136—202 |
| 3,161,786 | 12/1964 | Gunther | 310—4 |
| 3,247,714 | 4/1966 | Schwabe et al. | 73—359 |
| 3,296,032 | 1/1967 | Belofsky | 136—202 |
| 3,302,042 | 1/1967 | Grover et al. | 176—39 X |

FOREIGN PATENTS 638,106  5/1950  Great Britain.

OTHER REFERENCES

WADD Technical Report 60–699, vol. II. (Ad 256,916), Martin Co. et al. Sci. Lib. Nov. 20, 1961, pages cover and B47–B49, B82–B86, B88, B91, and B93–B95.

Werth J. Proc. 17th Ann. Power Sources Conf., October 1963 pp. 23–27.

White, D.C. Proc. 15th Ann. Power Sources Conf., October, 1961. pp. 124–132.

ALLEN B. CURTIS, Primary Examiner

PO-1050
(5/69)

UNITED STATES PATENT OFFICE
CERTIFICATE OF CORRECTION

Patent No. 3,483,037        Dated December 9, 1969

Inventor(s) Joseph A. Wagle

It is certified that error appears in the above-identified patent and that said Letters Patent are hereby corrected as shown below:

Column 3, in Claim 3, line 26, the numeral "1" should be changed to -- 2 --; line 29, Claim 4, the numeral "1" should ] changed to -- 2 --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents